Aug. 29, 1967   R. W. ANTHONY   3,337,964
CHECKER

Filed Aug. 3, 1966   4 Sheets-Sheet 1

INVENTOR.
RUSSEL W. ANTHONY
BY Whittemore,
Hulbert & Belknap
ATTORNEYS

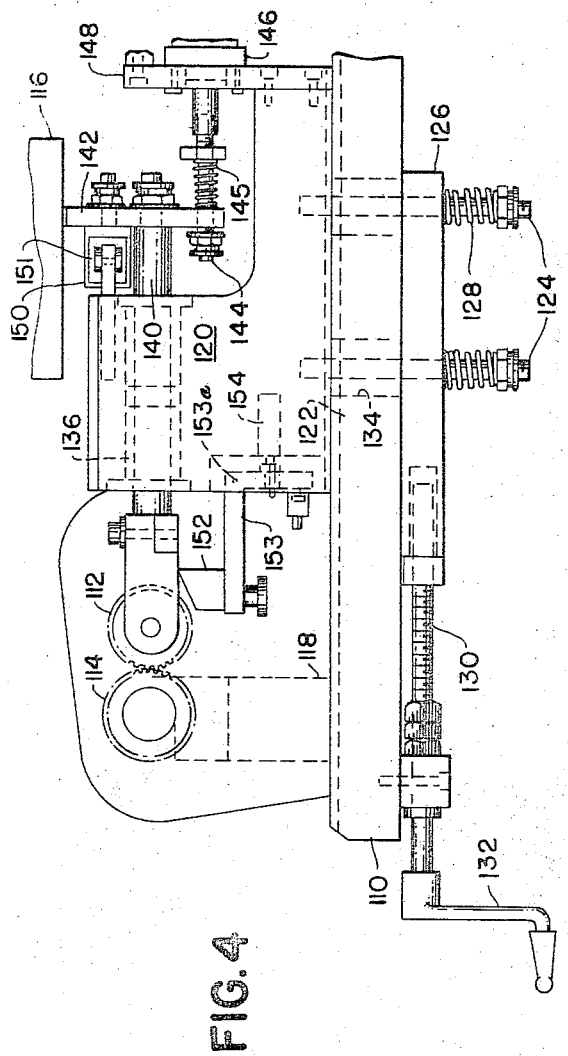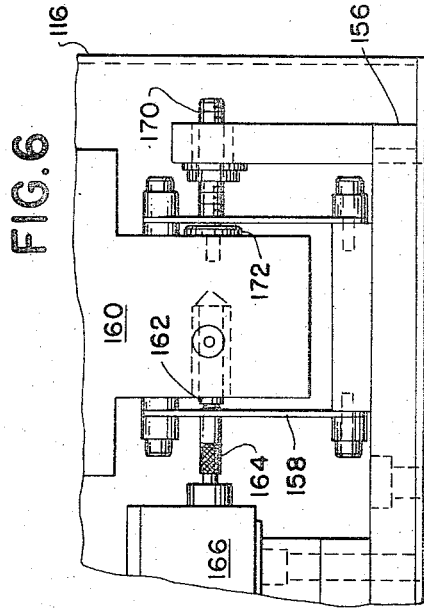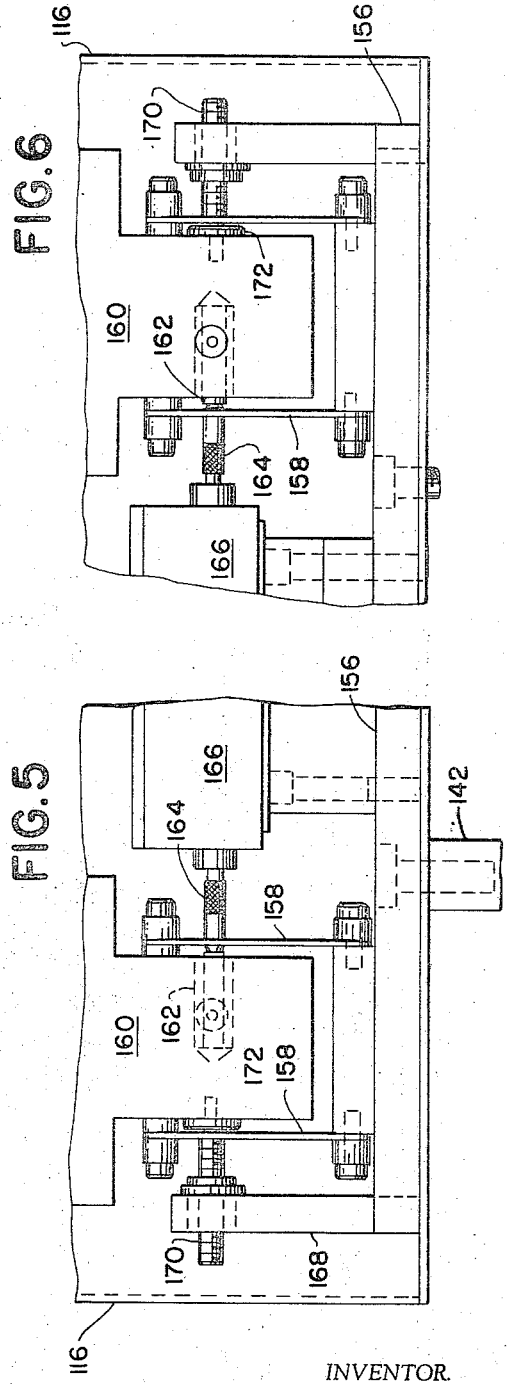

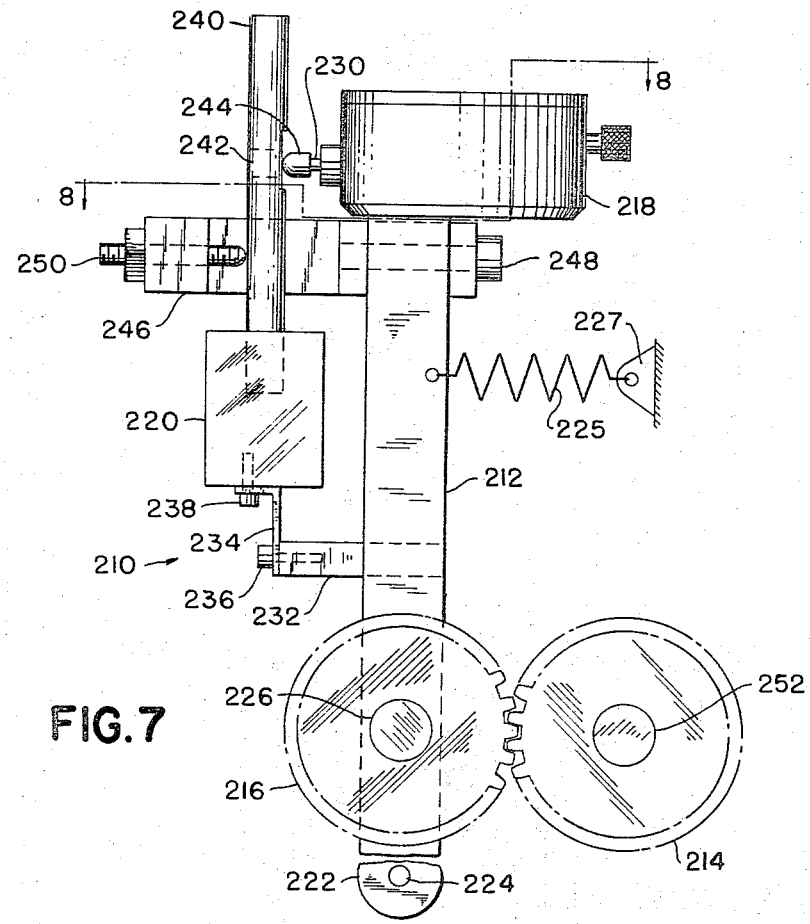
FIG. 7
FIG. 8
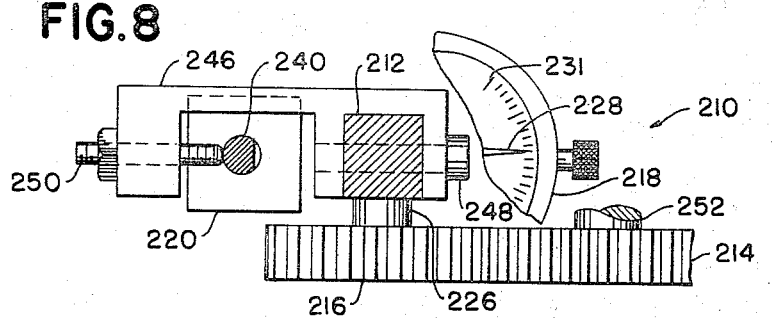
INVENTOR.
RUSSEL W. ANTHONY

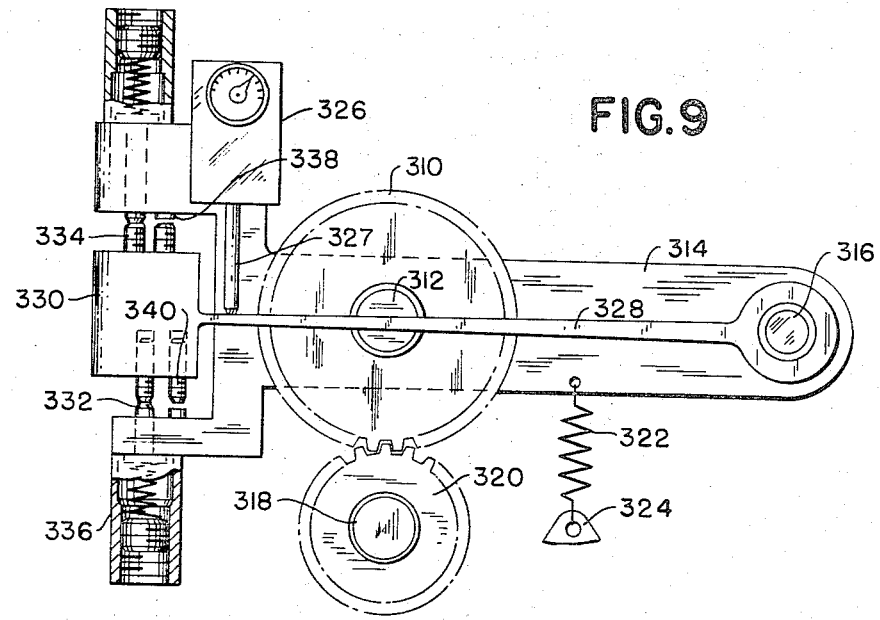

United States Patent Office 3,337,964
Patented Aug. 29, 1967

3,337,964
CHECKER
Russel W. Anthony, Detroit, Mich., assignor to National Broach & Machine Company, Detroit, Mich., a corporation of Michigan
Filed Aug. 3, 1966, Ser. No. 569,990
15 Claims. (Cl. 33—179.5)

ABSTRACT OF THE DISCLOSURE

A checker for sensing abrupt movement of a movable member comprising an inertia weight connected by resilient means to the movable member and having relative movement with respect to the movable member upon abrupt movement of the movable member, and means for sensing relative movement between the members.

---

The present application is a continuation-in-part of my copending applications Ser. No. 364,961 filed May 5, 1964, now Patent No. 3,299,521 (which is a continuation-in-part of my prior application Ser. No. 130,337 filed Aug. 9, 1961, now abandoned), Ser. No. 368,184 filed May 18, 1964, now Patent No. 3,284,909, and Ser. No. 486,242 filed Sept. 9, 1965, now abandoned (which is a continuation-in-part of my prior application Ser. No. 257,506 filed Feb. 11, 1963, now abandoned, and of copending application Ser. No. 364,961 filed May 5, 1964).

The present invention relates to a checker, and more particularly, to a gear checker for simultaneously checking gear characteristics such as eccentricity, and also errors such as tooth-to-tooth spacing, nicks on the gear teeth, and the like.

It is an object of the present invention to provide improved means for checking such errors as tooth-to-tooth errors, nicks, and the like.

It is a further object of the present invention to provide means for simultaneously checking eccentricity, tooth-to-tooth spacing, nicks and the like.

It is a further object of the present invention to provide a checker comprising a base, a member movable back and forth on said base at different speeds, an inertia member movable with said movable member relative to said base upon relative slow movement of said movable member relative to said base and movable relative to said movable member on relative abrupt movement of said movable member relative to said base, yieldable means operatively connected to said inertia member effective to cause said inertia member to move as aforesaid, and sensing means acting between said movable member and said inertia member to sense predetermined relative movement therebetween.

It is a further object of the present invention to provide a checker of the character set forth including magnetic means for maintaining the indicator in operative engagement with a member movable relative thereto.

Other objects and features of the invention will become apparent as the description proceeds, especially when taken in conjunction with the accompanying drawings, illustrating preferred embodiments of the invention, wherein:

FIGURE 4 is a side elevational view of a second embodiment of the present invention.

FIGURE 5 is an enlarged view of the inertia mechanism incorporated in the construction of FIGURE 4.

FIGURE 6 is a view similar to FIGURE 5 showing a re-arrangement of mechanism to provide a different sensing operation.

FIGURE 7 is a diagrammatic view of yet another embodiment of the present invention.

FIGURE 8 is a fragmentary sectional view on the line 8—8, FIGURE 7.

FIGURE 9 is a plan view of yet another embodiment of the present invention.

Figure 1:
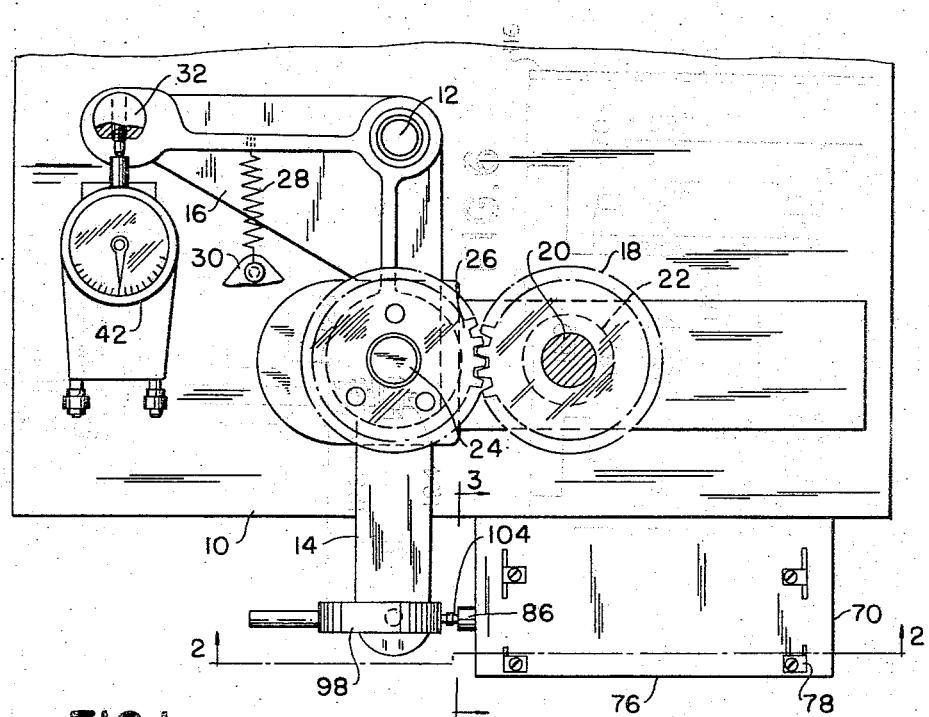
FIGURE 1 is a plan view of gear checking apparatus constructed in accordance with the present invention.
Figure 3:
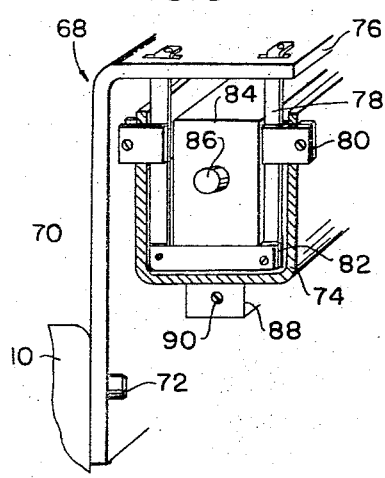
FIGURE 3 is a fragmentary elevational view looking substantially in the direction of the arrows 3—3, FIGURE 1.
Figure 2:
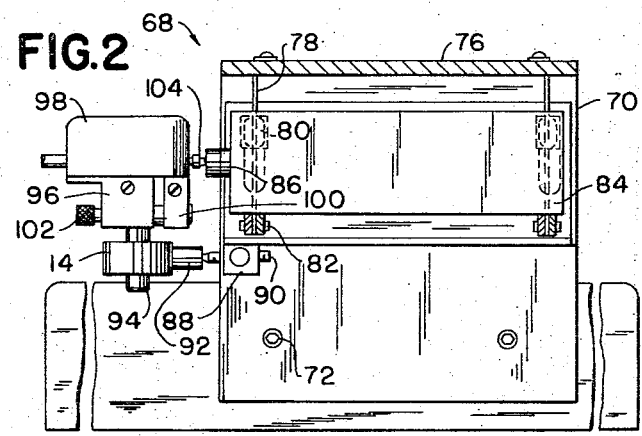
FIGURE 2 is a fragmentary side elevation looking in the direction of the arrows 2—2, FIGURE 1.

Referring now to FIGURES 1–3 the apparatus comprises a base 10 having a post 12 extending upwardly therefrom to which is pivoted a bell crank lever having arms 14 and 16. Means are provided for receiving and rotating a work gear 18 and this means comprises an arbor 20 driven in rotation by suitable means such as a motor 22. Mounted on a post 24 on the arm 14 is a master gear 26 conjugate to the work gear 18. A tension spring 28 connected between a fixed support 30 and the lever arm 16 is effective to urge the lever in a counter-clockwise direction about its mounting post 12 so as to maintain the teeth of the master gear 26 in full mesh with the teeth of the work gear 18.

The upper surface of the base 10 is provided with an indicator 42. The indicator 42 includes a movable extending plunger which engages the adjacent end of the arm 16.

Rotation is imparted to the arbor 20 causing the work gear 18 to rotate about its axis. If it is assumed that the work gear has eccentricity, the master gear 26 will be moved in a slight arc about the axis of its pivot post 12. Continued rotation of the work gear will then cause the arm 16 to move first to the left and then back to the right, as the work gear completes one revolution. If at this time the indicator is zeroed the maximum eccentricity will be observed and may be read or may provide a semi-permanent indication on the indicator, as is well understood in the art. While the illustration is of a conventional indicator it will be understood that it will ordinarily be desirable to employ extremely accurate indicating devices such for example as those electrically actuated. These may be of the type referred to as LVDTs which are familiar in this art.

Referring now more particularly to FIGURE 1 in conjunction with FIGURES 2 and 3, there will be described the mechanism for sensing such errors as tooth-to-tooth spacing and nicks on the teeth of the work gear. For this purpose the checking structure indicated generally at 68 is provided. This apparatus is mounted on a bracket 70 secured to one side of the base 10 by screws indicated at 72. The checking structure 68 includes a U-shaped body 74 which is suspended from a horizontal arm 76 of the bracket 70 by flexible reeds 78, in such a way as to be biased to the left as seen in FIGURE 2, and to follow movement of arm 14. The U-shaped body 74 is affixed to intermediate portions of the reeds 78 by rigid clamps 80 so that the U-shaped body 74 is permitted to swing to the right and left as seen in FIGURE 2 due to the flexibility of the upper portions of the reeds 78 intermediate the clamps 80 and the horizontal arm 76.

Rigidly affixed to the lower ends of the flexible reeds 78 are cross bars 82 which support a relatively heavy inertia weight 84 having at one end thereof an indicator actuating extension 86.

The U-shaped body 74 carries a block 88 carrying an adjustable abutment screw 90.

As best seen in FIGURE 2, the right arm 14 has an abutment 92 thereon in position to engage the end of the adjustable abutment screw 90. In addition, the lever arm 14 near its end is provided with a post 94 extending through an opening therein which at its upper end carries an indicator support block 96. Slidable in ways provided at the top of the support block 96 is an indicator 98 having a depending ear 100 receiving an end of adjusting screw 102 by means of which the indicator may be moved toward and away from the inertia weight 84. The indicator 98 includes an operator 104 engageable with the actuating extension 86 of the weight 84.

With the structure as above described, its operation in sensing tooth-to-tooth spacing and/or nicks on teeth of the work gear will be described. In the first place it should be kept in mind that an error in eccentricity will cause movement of the lever arms 14 and 16 back and forth once during a complete rotation of the work gear. However, tooth-to-tooth spacing errors as well as a nick on a single tooth of the work gear will produce abrupt movement of the master gear and the supporting bell crank lever, this movement being insured by the spring 28 which maintains the gears in tight mesh at all times. In order to sense both eccentricity as well as the abrupt errors of the tooth-to-tooth spacing type, the work gear is driven in rotation at a speed which permits the inertia weight to substantially follow the movement of the U-shaped body 74 caused by gear eccentricity, the weight being suspended by the lower portions of the reeds 78 intermediate the bars 82 and the clamps 80.

By way of example, if a nick on a tooth of the work gear passes through the zone of mesh, the lever is rotated abruptly about the axis of pivot post 12 by a small amount and is returned to its initial position by the action of spring 28 as soon as the nick has moved through the zone of mesh. The result of this is that the abutment 92 on the lever arm 14 moves to the left as seen in FIGURE 2 an amount which depends upon the magnitude of the nick. This movement is imparted directly to the U-shaped body 74 and is of course accompanied by corresponding movement of the indicator 98. However, at this time, due to its inertia, the inertia weight 84 lags behind the movement of the U-shaped carrier body 74 and this results in a relative movement between the indicator 98 and the inertia weight 84 such that the extension 86 of the weight permits the operator 104 of the indicator to move out by an amount dependent upon the magnitude of the nick, tooth-to-tooth error, or the like.

It will of course be apparent that the indicator 36 may include a pointer so that the magnitude of the error may be noted but in the usual case the indicator is of the extremely sensitive type, such as an LVDT, and will be connected by suitable wiring to operate signals or the like which may indicate that the error noted is outside of acceptable limits.

In the foregoing the abrupt movement of the lever arm 14 is first to the left and then to the right, as seen in FIGURE 1. Since the U-shaped body 74 follows movement of the lever arm 14, the initial quick movement of the arm 14 to the left causes the indicator 98 to move away from the inertia weight 84. However, it will of course be apparent that if the bracket 70, body 74, and weight 84 were positioned on the other side of the lever arm 14, equivalent results could be obtained. In this case the initial quick movement of the lever arm 14 would move the body 74 with it, and the lagging of the inertia weight 84 behind would depress the indicator actuator or operator 104.

Referring now to FIGURES 4–6, the gear checking mechanism comprises a base 110 on which are provided a plurality of gear checking and marking assemblies each comprising gear rolling equipment including a plurality of master gears 112 mounted for rotation and for movement radially of a corresponding work gear 114, inertia means indicated generally at 116 for sensing nicks on the teeth of the work gear, and gear marking mechanism indicated at 118. More specifically, there is provided a generally L-shaped block 120 slidable in ways indicated at 122 provided at the top of the base 110, the block being retained in adjusted position by a pair of posts 124 threaded at their upper ends in the block and carrying an actuator slide 126 which is spring pressed against the bottom of the base 110 by springs 128. The actuator slide 126 has a threaded opening receiving an actuating screw 130 rotatably mounted on the base 110 and adapted to be rotated by a crank 132. Limited horizontal movement of the gear checking units is permitted by virtue of enlarged openings 134 in the base 110 through which the posts 124 extend.

Slidable in bearings 136, which preferably are in the form of ball bushings, is a shaft 140 which at its left hand end as seen in FIGURE 4, mounts the master gear 112 for free rotation. At the end remote from the master gear 112, the shaft 140 carries a vertical plate 142 to the upper end of which the inertia mechanism 116 is rigidly affixed. The plate 142 is connected through a rod 144 and a compression loading spring 145 to an air cylinder 146 rigidly affixed to a plate 148 secured to the block 120. Also carried by the plate 142 is a post 150 having flat sides engageable by rollers 151 which retain the shaft 140 and associated mechanism against rotation during its axial reciprocation.

Mounted adjacent the position of the master gear 112 is a brake block or shoe 152 carried by a bell crank lever 153 pivotally mounted in a recess in block 120 as seen at 153a. The shoe is yieldably biased by a spring 154 into the position shown. When the master gear or gears 112 is or are retracted to the right by the air cylinder means 146 for loading the work gear, each master gear engages a brake shoe 152 which opposes its rotation. The shoe is yieldable downwardly in accordance with spring opposed pivotal movement of the bell crank lever 153. If, when the air cylinder 146 is actuated to permit the spring 145 to shift the master gear toward its associated work gear, it some times happens that the master gear does not enter into mesh with the teeth of the work gear, the master gear remains in engagement with the brake shoe, and the rotation of the work gear 114 thus causes the teeth of the work gear to slip off the crests of the teeth of the master gear and thus bring about full mesh. The position of the brake shoe is determined by an adjustable abutment 155 so that when the master gear meshes with the work gear, it has moved out of engagement with the brake by an amount sufficient to permit the anticipated axial movement of the shaft 140 in the gear checking operation without re-engaging the brake shoe.

The present invention is capable of checking single work gears but finds its most effective use in checking cluster gears. It will be appreciated that the gear 114 in FIGURE 4 may be considered any one of the gears of a cluster gear. Suitable means (not shown) are provided for engaging the work piece 114 and rotating it while the several gears thereon are in mesh with corresponding master gears. In order to permit ready loading of the work gear, a preliminary locator may be provided on which shaft portions of the work piece intermediate the gears thereon rest, and if desired, centers may advance to engage the ends of the shaft of the work piece to pick it up into a position of a slight clearance. The marker 118 indicated in FIGURE 4, may include locator structure at the upper end as indicated or the locator may be entirely separate from the marker 118. Details of the marker 118 are set forth in copending application Ser. No. 368,184, now Patent 3,284,909, and will not be repeated herein.

If desired, means (not shown) may be carried by the plate 142 for cooperation with fixed means on the block 120 which affords an accurate indication of the position of the shaft 140 and hence affords a correspondingly accurate measurement of the diameter of the work gear 114. This means is not illustrated in the figures because it is well known and may conveniently be provided wherever space permits. It will be appreciated that if a work gear of a predetermined size and having a predetermined eccentricity is mounted in the position of the work gear 114, the master gear 112 will be moved to a position approximately corresponding to the pitch diameter of the work gear. If now, an eccentric work gear 114 is rotated through 360 degrees the master gear 112 will correspondingly be rotated and the shaft 140 will move to the right and left, back to its initial position once during each complete rotation of the work gear 114. When checking for nicks, the work gear is rotated relatively slowly so that the axial movement of the shaft 140 corresponding to run-out or eccentricity, will be correspondingly slow. As is well understood, measuring instruments of the type referred to herein are ordinarily connected with recorders so that the recorder will indicate and record the amount of run-out or eccentricity.

Referring now particularly to FIGURE 5 there is illustrated one embodiment of the invention, the inertia checking means indicated at 116 in FIGURE 4 being shown with the housing broken away to expose the operating mechanism. The inertia checker, mounted on the plate 142 as hereinbefore described, comprises a base 156 having two pairs of vertically extending flexible reeds 158 connected thereto to the upper end of which is connected a relatively heavy weight 160. The weight 160 carries a permanent magnet 162 one end of which extends beyond a side surface of the weight and is contacted by the end of the actuating plunger 164 of a sensitive measuring instrument 166 such for example as a linear variable differential transformer. The use of the permanent magnet 162 permits the elimination of the usual bias spring connected to the actuating plunger 164 and maintains the plunger in contact with the magnet on movement back and forth of the weight 160, as will subsequently be described.

Connected to the base 156 is a rigid post 168 carrying an adjustable abutment screw 170 one end of which is engageable with the flat outer surface of the head of an abutment member 172. The adjustable abutment screw 170 is adjusted to provide a very light bias against the resilience of the reeds 158 so as to maintain the part in the relationship illustrated under normal operating conditions to determine the rest position of the weight 160. If the mounting plate 142 moves to the right and left as seen in FIGURE 5, at the slow rate resulting from run-out or eccentricity of the work gear, the inertia weight moves with the base 156 and there is no indication or signal on the sensing device 166. If however, a tooth of the work gear 114 has abrupt tooth-to-tooth spacing error such for example as many result from a nick on the tooth, when this nick passes through the zone of tight mesh with the master gear the master gear will be displaced abruptly to the right with a corresponding abrupt movement to the right of all the mechanism shown in FIGURE 5. The magnitude of this movement will of course depend upon the size of the nick. As soon as the nick has passed through the zone of mesh, the spring 45 causes immediate movement of the plate 142 and the base or support 156 to the left to maintain tight full mesh engagement between the teeth of the work gear and the teeth of the master gear. However, the abrupt movement of the mechanism shown in FIGURE 5 to the right has imparted momentum to the inertia weight 160 and as the base 156 moves abruptly to the left, carrying the sensitive indicator 166 with it, the reeds 158 supporting the weight 160 bend and the plunger 164 of the indicator is depressed by an amount which is a function of the magnitude of the nick.

The mechanism shown in FIGURE 5 may also be adjusted to work when in reverse position, this position being indicated in FIGURE 6 in which corresponding parts are identified by the same reference characters. In this case passage of a nick on a tooth of the work gear through the zone of mesh with the master gear will result in abrupt shifting of the support or base 156 to the right. At this time movement of the inertia weight 160 is opposed only by the very light bias of the reeds 158 and accordingly the weight 160 lags behind. However, during movement of the support 156 and associated mechanism to the right, the inertia block or weight 160 starts to move to the right and it continues to the right when the support 156 and associated structure returns rapidly to the left under the bias of the spring 145. Thus, as the support 156 approaches the initial position from which it was abruptly displaced by passage of a nick, there is an impact between the adjustable abutment screw 170 and the abutment member 172. This impact causes the inertia weight 160 to move to the left further than its rest position, thus pressing the actuating plunger 164 of the indicator 166 inwardly to cause it to sense the neck. That this operation is as described in the foregoing is established by the fact that normally open switch points may be provided in the indicator 166 having a spacing of approximately .010″. By adjustment of the adjustable abutment screw 170, inertia checking instruments may be set to measure nicks having effective heights of .0010″, .0018″, .0022″, and .0030″. In other words, at the minimum setting, an abrupt back and forth movement of the shaft 140 in an amount corresponding to .0010″ is effective to cause closure of switch points having a normal spacing of .010″.

As shown best in FIGURE 7 the inertial gear checker 210 includes a pivotally mounted support 212 movable in accordance with the variations in the value of a parameter such as tooth-to-tooth spacing of the work gear 214 by comparison with the same parameter of the master gear 216. The inertial gear checker 210 further includes the indicator 218 rigidly secured to the support 212 and the high inertial weight 220 secured to the support 212 for movement with respect to the support 212 in accordance with the movement of the support 212 for actuating the indicator to register the variation in the value of the selected parameter of the gear 214.

More specifically, the support 212 is an elongated substantially rigid member which is pivotally mounted at the end 222 by pivot pin 224. Master gear 216 is mounted for rotation on support 212 by the gear mounting stud 226. The support 212 is biased toward the work gear 214 by convenient means, such as spring 225 secured to a fixed support 227.

The indicator 218 is of the type having a rotatably mounted pointer 228 responsive to the axial position of the plunger 230 to register on the dial 231 the maximum angular position attained by the pointer 228 due to axial movement of the plunger 230. The internal structure of such indicators is well known and will therefore not be considered at this time.

The high inertia weight 220 is supported on the support member 212 by the bracket 232 and the resilient reed 234, which reed may be of spring metal and is secured at opposite ends to the bracket 232 and weight 220 by convenient means, such as bolts 236 and 238, respectively. The post 240 is rigidly secured to the high inertia member 220 for movement therewith from the position shown in FIGURE 7 wherein the post 240 is in engagement with the plunger 230 of indicator 218 and abutment 250.

A permanent magnet 242 is secured in the post 240 so that the head 244 of magnetic material on the plunger 230 will maintain contact with the post 240 during movement of the post 240 relative to the support 212 and indicator 218.

An E-shaped bracket 246 is secured to the support 212 by convenient means, such as the bolt 248. The adjustable abutment 250 is positioned in the bracket 246 to provide a limit for the counterclockwise movement of post 240 and therefore provide a starting position for the high inertia member 220.

In operation a work gear is positioned on stud 252 for rotation in mesh with master gear 216 for checking of a predetermined parameter, such as tooth-to-tooth spacing. The gears 214 and 216 are caused to rotate at a speed to produce a sudden counterclockwise movement of the support 212 on an objectionable tooth-to-tooth spacing being found on the work gear 214.

A sudden counterclockwise movement of the support member 212 will produce relative movement between the high inertia member 220 and the support 212 since the high inertia member 220 will follow the sudden movement of the support 212 at a slower rate. The high inertia member 220 and the post 240 will therefore move clockwise about a pivot axis in the resilient reed mounting 234 to displace the plunger 230 axially an amount determined by the relative movement of the support 212 and member 220 which is proportional to the error in the gear parameter being checked for.

Subsequently, the support will return to the position thereof for a correct value of the parameter and the high inertia member and post will return to the position shown wherein the post 240 is engaged with the abutment 250. During the return movement of the post 240 the plunger 230 of the indicator 218 is held in engagement therewith due to the magnetic attraction of the head 244 of the plunger 230 for the magnet 242.

Thus, with the invention as disclosed above the actuation of indicator 218 by the high inertial member 220 is positive in both directions and does not depend on the spring strength of the indicator plunger 230 to maintain head 244 in engagement with post 240. Similiarly, it will be noted that due to the provision of abutment 250 the starting or rest position of post 240 is always the same whereby the indicator indication does not depend on an indefinite balance between the force of the reed 234 and the spring strength of the indicator plunger.

Referring now to FIGURE 9 there is illustrated another embodiment of the invention in which a master gear 310 is mounted for rotation on a post 312 carried by a lever 314 which in turn is mounted on a stationary pivot post 316. A driving arbor 318 is provided for receiving a series of work gears 320 and for driving these in tight meshed engagement with the master gear 310. A tension spring 322 is provided extending between the lever 314 and a stationary spring anchor 324 operating to maintain the master gear and work gear in tight mesh. The lever arm 314 carries an indicator or sensing device 326 including a movable plunger or actuator 327.

Also rotatably mounted on the pivot post 316 is a second lever or arm 328 which at its outer end is provided with a relatively heavy inertia weight 330. The arm 314 is bifurcated at its outer ends and is provided with centering plungers 332 engageable with abutment screws 334 carried by the weight 330. The plungers 332 are lightly biased by adjustable compression springs 336. In addition, limiting abutment means are provided including the abutments 338 carried on the arm 314 and adjustable abutment screws 340 carried by the weight 330.

The actuating plunger 327 of the sensing device 326 engages the lever 328.

If the work gear 320 is eccentric, the relatively slow motion imparted to the lever arm 312 by rotation of the gear 320 will permit the inertia weight 330 to follow the movement thereof. However, upon abrupt movement of the lever 314 such as occasioned by a tooth-to-tooth spacing error, or a nick, the inertia of the weight 330 will cause it to lag behind and hence provide a relative movement between the weight 330 and the indicator or sensing device 326. Suitable signal means or the like electrically connected to the sensing device 326 may be opposed thereby to indicate that the error noted is outside the range of tolerance permitted.

The mechanism illustrated in FIGURE 9 may be adjusted to operate in a different manner. With the parts in the relationship illustrated in FIGURE 9, the lower adjustable abutment screw 340 can be moved outwardly to engage the cooperating rigid abutment 338. If a nick or burr passes through the zone of mesh between the gear members 310 and 320, the lever arm 314 will move abruptly first in a clockwise direction and then in a counterclockwise direction. If the lower abutments 338 and 340 are in contact at this time the entire construction moves abruptly in a clockwise direction. However, upon reverse or counterclockwise direction of the lever arm 314 together with the indicator 326, the indicator is actuated because the inertia weight 330 will continue its clockwise movement for a measurable interval before it returns to the position in which the lowermost abutments 338 and 340 are in contact.

The initial or rest position of the inertia member relative to the movable gear support may be determined by resilient elements such as the flexible reeds 78 shown in the embodiment of the invention illustrated in FIGURES 1–3, or it may be in the form of opposed compression springs 336 as shown in FIGURE 9. These are merely exemplary of simple biasing means and it will of course be understood that the biasing means may be constituted by a particular mounting of the inertia weight so that the force of gravity thereon biases it to an initial or rest position relative to the movable support. Other variations of course may suggest themselves such for example as gravity biased lever means having an arm engageable with the inertia weight, permanent or electromagnets, or the like.

From the foregoing it will be observed that the structure basically involves a movable member which is adapted to move back and forth at different velocities, an inertia member, rigid abutment means interacting between the movable member and inertia member and adapted to remain in engagement when the movable member is moved back and forth slowly but to separate as a result of relative movement between the movable member and the inertia member resulting from relatively abrupt movement of the movable member, and a sensing device acting between the movable member and the inertia member to sense relative movement therebetween. In addition, the arrangement is such that the inertia member is subjected to relatively small forces tending to maintain the abutment means between the inertia member and the movable member in contact. The small forces may be spring means as generally illustrated herein, gravity resulting from appropriate mounting of the movable and inertia members, or other means such for example as magnetic means interconnecting the movable member and the inertia member. The abrupt movement of the movable member may be imparted directly to the inertia member and establish momentum in the inertia member which will cause relative movement between the movable member and the inertia member when the movable member stops its abrupt movement and returns to initial position. Alternatively, the movement of the movable member may be away from the inertia member, inertia causing the inertia member to lag behind upon abrupt movement of the movable member away therefrom. Finally, as disclosed in one of the embodiments, the relative movement between the movable member and inertia member may be multiplied by abrupt movement of the movable member away from the inertia member, followed by a small movement of the inertia member toward the movable member and terminating in abrupt movement of the movable member toward the inertia member, impacting the inertia member and causing it to move a substantial distance.

The drawings and the foregoing specification constitute a description of the improved checker in such full, clear, concise and exact terms as to enable any person skilled in the art to practice the invention, the scope of which is indicated by the appended claims.

What I claim as my invention is:

1. Checking apparatus for discriminating between relatively slow and relatively abrupt movement of a movable member comprising a base, a member movable back and forth on said base at different speeds, an inertia member movable with said movable member relative to said base upon relatively slow movement of said movable member relative to said base and movable relative to said movable member on relatively abrupt movement of said movable member relative to said base, abutment means acting between said movable member and said inertia member and effective to predetermine the relative rest positions of said members, yieldable means operatively connected between said movable member and said inertia member and urging said inertia member toward said movable member and effective to cause said inertia member to move with said movable member upon relatively slow movement of said movable member relative to said base and yieldable to provide for relative movement between said movable member and said inertia member upon relative abrupt movement of said movable member relative to said base, and sensing means acting between said movable member and said inertia member operable to sense predetermined relative movement therebetween.

2. Apparatus as defined in claim 1 comprising means for adjusting said abutment means.

3. Apparatus as defined in claim 1 in which said yieldable means comprises resilient means.

4. Apparatus as defined in claim 1 in which said inertia member is connected to said movable member for movement relative thereto by vertical flexible reeds.

5. Apparatus as defined in claim 4 in which said reeds are fixed at their lower ends to said movable member and at their upper ends to said inertia member.

6. Apparatus as defined in claim 1 in which said sensing means comprises relatively movable parts one of which is operatively connected to and movable with said movable member and the other is operatively connected to and movable with said inertia member.

7. Apparatus as defined in claim 6 in which one of said parts is operatively connected to one of said members by magnet means, thereby eliminating biasing springs acting between said parts.

8. Apparatus as defined in claim 1 comprising rigid abutment means acting between said movable member and said inertia member, said yieldable means urging said inertia member in a direction to engage said abutment means and having an effectiveness to maintain said abutment means in contact only during relatively slow movement of said movable member relative to said base.

9. Apparatus as defined in claim 8, the abrupt movement of said movable member in a direction to maintain contact between said abutment means followed by return movement of said movable member resulting in further movement of said inertia member.

10. Apparatus as defined in claim 8, the abrupt movement of said movable member in a direction to separate said abutment means resulting in relative movement between said movable and inertia members on initial abrupt movement of said movable member.

11. Apparatus as defined in claim 10 comprising means for moving said movable member abruptly to its initial position following abrupt displacement therefrom, said abutment means being engageable during abrupt return movement of said movable member to impact said inertia member and to displace it beyond its initial position as determined by the initial position of said movable member.

12. Apparatus as defined in claim 1 comprising adjustable rigid abutment means at opposite sides of said inertia member acting between said movable member and said inertia member.

13. Apparatus as defined in claim 1 comprising adjustable rigid abutment means at opposite sides of said inertia member acting between said movable member and said inertia member, and adjustable resilient biasing means at both sides of said inertia member acting between said inertia member and said movable member.

14. Apparatus as defined in claim 1 in which said movable member comprises first means for supporting a gear for rotation in fixed location on said movable member, second means on said base for supporting a second gear for rotation in fixed location on said base in tight mesh with a gear on said second means, means for rotating said first or second means whereby eccentricity of one of the gears causes slow movement of said movable member.

15. Apparatus as defined in claim 3 comprising means for adjusting the effectiveness of said yieldable resilient means.

No references cited.

LEONARD FORMAN, *Primary Examiner.*

SAMUEL S. MATTHEWS, *Examiner.*